United States Patent
Koskela et al.

(10) Patent No.: US 9,723,466 B2
(45) Date of Patent: Aug. 1, 2017

(54) ENHANCED CONTROL OF SERVICES

(71) Applicant: Nokia Corporation, Espoo (FI)

(72) Inventors: Jarkko Koskela, Oulu (FI);
Jussi-Pekka Koskinen, Oulu (FI);
Ilkka Antero Keskitalo, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/529,758

(22) Filed: Oct. 31, 2014

(65) Prior Publication Data
US 2015/0126147 A1     May 7, 2015

Related U.S. Application Data

(60) Provisional application No. 61/898,888, filed on Nov. 1, 2013.

(51) Int. Cl.
*H04W 4/22* (2009.01)
*H04W 48/04* (2009.01)
*H04W 48/02* (2009.01)

(52) U.S. Cl.
CPC ............ *H04W 4/22* (2013.01); *H04W 48/02* (2013.01); *H04W 48/04* (2013.01)

(58) Field of Classification Search
CPC ................................ H04W 4/22; H04W 48/04
USPC ..................................................... 455/404.1
See application file for complete search history.

(56) References Cited

U.S. PATENT DOCUMENTS

| | | | |
|---|---|---|---|
| 2010/0240338 A1* | 9/2010 | Mallick et al. | 455/404.1 |
| 2012/0170503 A1* | 7/2012 | Kelley | H04W 48/06 370/312 |
| 2014/0233448 A1* | 8/2014 | Yun | H04W 4/06 370/312 |
| 2015/0181403 A1* | 6/2015 | Tanaka | H04W 48/06 455/404.1 |
| 2015/0257088 A1* | 9/2015 | Hsu | H04W 72/0486 370/328 |
| 2015/0304937 A1* | 10/2015 | Kim | H04W 48/14 370/230 |

OTHER PUBLICATIONS

3rd Generation Partnership Project; Technical Specification Group Services and System Aspects; Service Accessibility (Release 12), 3GPP TS 22.011, V12.0.0 (Mar. 2013).

3rd Generation Partnership Project; Technical Specification Group Core Network and Terminals; IMS multimedia telephony communication service and supplementary services; Stage 3; (Release 12) 3GPP TS 24.173 V12.2.0 (Sep. 2014).

Qualcomm Incorporated, Access Class Barring for VoLTE, 3GPP TSG-RAN WG2 Meeting #83bis 7.10.1 R2-133276 Ljubljana, Solovenia, Oct. 7-11, 2013.

* cited by examiner

*Primary Examiner* — Muthuswamy Manoharan
(74) *Attorney, Agent, or Firm* — Mintz Levin Cohn Ferris Glovsky and Popeo, P.C.

(57) ABSTRACT

Methods and apparatus, including computer program products, are provided for control of service. In one aspect there is provided a method. The method may include receiving, at an application client at the user equipment, access control information, wherein the access control information indicates whether access to a network is allowed; and determining, at the application client, whether to allow a call attempt by the user equipment based on at least the received access control information. Related apparatus, systems, methods, and articles are also described.

17 Claims, 5 Drawing Sheets

ENHANCED CONTROL OF SERVICES

CROSS REFERENCE TO RELATED APPLICATION

This application claims the benefit under 35 U.S.C. §119(e) of the following provisional application, which is incorporated herein by reference in its entirety: U.S. Ser. No. 61/898,888, entitled "ENHANCED CONTROL OF SERVICES," filed Nov. 1, 2013.

FIELD

The subject matter described herein relates to wireless communications.

BACKGROUND

Public land mobile networks may be configured to control access by user equipment. This access control may prevent certain user equipment from initiating access to the network, responding to network pages, and the like. For example, in an emergency, a network service provider may control access in order to reduce network congestion. The base station serving a cell may broadcast information to user equipment, and this broadcast may indicate the types of user equipment barred access to the network. Specifically, a user equipment may be assigned to an access class (AC), such as 0 to 9. The assigned access class may be stored in the user equipment in a subscriber identity module (SIM), universal SIM, and/or any other secure storage mechanism. A user equipment may also be assigned to certain high priority access classes, such as access classes 11 to 15, which can also be stored in the SIM, USIM, and the like, and calls made as emergency calls are handled as access class 10.

When congestion or a network overload condition occurs, such as during an emergency, the network may broadcast which access classes are access barred, the duration of the barring, and/or the rate of the barring. The user equipment may receive the indication and then not allow accessing to the network, responding to a page, and/or the like. 3rd Generation Partnership Project; Technical Specification Group Services and System Aspects; Service accessibility (Release 12), 3GPP TS 22.011, V12.0.0 (2013-03) (hereinafter TS 22.011) provides an example of a specification for access barring.

SUMMARY

Methods and apparatus, including computer program products, are provided for control of service.

In some example embodiments, there is provided a method The method may include receiving, at an application client at the user equipment, access control information, wherein the access control information indicates whether access to a network is allowed; and determining, at the application client, whether to allow a call attempt by the user equipment based on at least the received access control information.

In some variations, one or more of the features disclosed herein including the following features can optionally be included in any feasible combination. The access control information may be provided to the application client by an access stratum. The access control information may include emergency access barring. The call attempt may include an emergency call attempt. The emergency call attempt may include one of the multimedia telephone voice for emergency call or circuit switch fall back emergency call. The application client may allow the emergency call attempt, when the access control information for the emergency call attempt is not available. The application client may allow emergency call attempt, when the access control information for the emergency call allows the emergency call attempt. The application client may bar the emergency call attempt, when the access control information for the emergency call is not available. An access class of the user equipment may be accessed to determine whether access to the network is barred. The application client may include at least one of an internet protocol multimedia subsystem client and a session initiation protocol client. The access control information may be retrieved from an access stratum comprising a radio resource control client at the user equipment. The radio resource control client may receive the access control information from a base station via at least one of a system information and a dedicated signaling, wherein the access control information includes one or more access barring parameters. The call attempt may include at least one of a voice over long term evolution call, a multimedia telephony call, and a multimedia video call, a data call, a high-priority call, and a signaling exchange. The access control information may include at least one of access class barring information and a service specific access control information. The application client may allow, based on the determining, the call attempt, when the received access barring information indicates access is not access barred. The user equipment may be in a radio resource control idle state. The user equipment may be in a radio resource control connected state.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
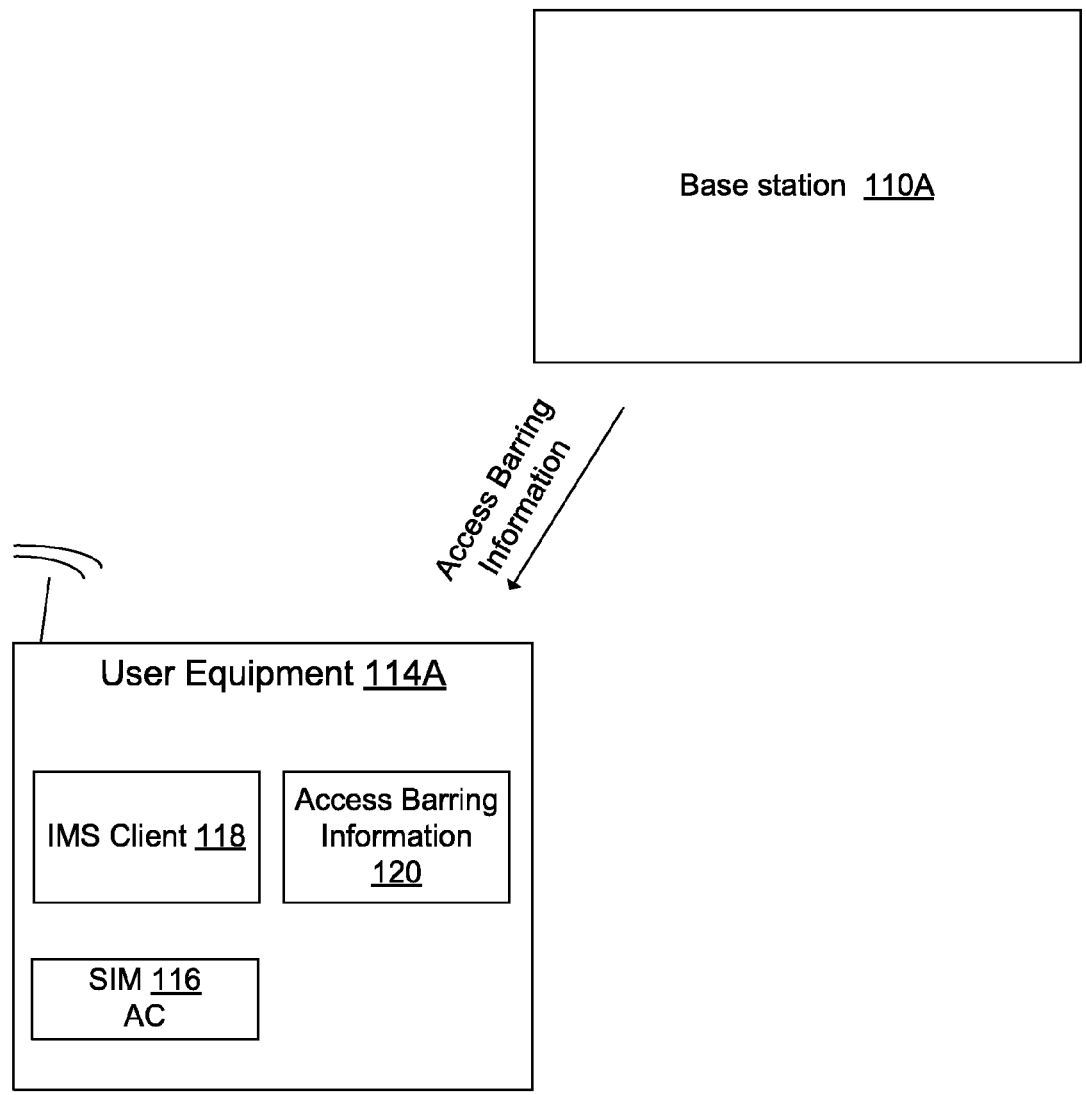
FIG. 1 depicts an example of a system for access barring, in accordance with some exemplary embodiments.

Like labels are used to refer to same or similar items in the drawings.

DETAILED DESCRIPTION

Due in part to the proliferation of user equipment including smartphones, land mobile network operators are experiencing increases in signaling and traffic loads on their networks. This load increase becomes somewhat of a problem during certain events, such as disasters, riots, public concerts, sporting events, and other mass events. Specifically, an event can trigger a mass of user-generated and/or application-generated accesses to the network concentrated within a certain time, causing severe congestion in the network including the radio access network and core networks.

Given the possibility of congestion, a mobile network operator may want to prioritize certain services and/or accesses to the network. For example, emergency access and high priority access to the network may be given priority over other accesses. In addition or alternatively, priority may be given to certain signaling messages, such as radio resource control (RRC)/network access stratum (NAS) messages over normal traffic or other types of signaling. In addition or alternatively, priority may be given to certain types of services, such as voice services over non-voice services (or vice versa). The control of the prioritization control may be mobile network operator-specific, depending thus on specific policies at the mobile network operator. For example, a mobile network operator may want to configure access barring, so that user equipment is allowed to make emergency calls but preventing the user equipment from initiating other types of accesses (of vice versa).

3GPP TS 22.011 does provide some uplink congestion mitigation control mechanisms. For example, a Service Specific Access Control (SSAC) congestion control mechanism may be implemented, so that the network can suppress, when congestion occurs, initiation of multimedia telephony (MMTEL-voice) and multimedia telephony vide (MMTEL-video). However, SSAC does not work for prioritizing MMTEL-voice over normal data. Access Class Barring (ACB) congestion control mechanism may be implemented, so that the network can control, during times of congestion, connection requests (for example, mobile originated (MO)-data and MO-signaling). But voice services are considered MO-data in ACB, so applying ACB results in voice services being suppressed along with non-voice services. RRC Connection Reject signaling provides a congestion control mechanism as well. RRC Connection Reject allows the network to reject connection requests based on establishment cause (for example, MO-data in congestion). However, the base station/eNB cannot typically recognize connection requests aiming for voice, so the base station/eNB would reject voice service requests in congestion. Lastly, Random Access (RA) Backoff provides a congestion control mechanism that allows the network to delay random access attempts in congestion. However, applying RA backoff may result in voice service initiations being delayed along with non-voice services. Thus, although some specifications provide uplink congestion mitigation mechanisms, mobile network operators may not be able to rely on past mechanisms for the purpose of prioritizing or prevention of mobile originating voice calls in congestion.

In some example embodiments, the subject matter disclosed herein relates to connected mode, such as radio resource control (RRC) connected mode, operation with respect to emergency calls and access class barring (ACB).

In some example embodiments, voice calls, such as voice over long term evolution (VoLTE) calls, are considered access class barring (ACB) and emergency barring in a cell. However, to avoid double barring, the access class barring may only be applied at an internet protocol multimedia system (IMS) level, bypassing thus ACB at the access stratum level. In effect, ACB/emergency barring is applied at the IMS level (for example, at a session initiation protocol (SIP) proxy, an application, and/or the like), rather than at a lower-level access stratum level, such as part of RRC connection establishment. However, double barring may be applied as well, so that normal ACB is applied at the access stratum (AS, i.e., radio layer), and ACB plus SSAC/emergency barring is applied at the IMS level.

FIG. 1A depicts an example system 100 for enhanced control of services, in accordance with some example embodiments.

The system 100 may include at least one user equipment 114A and a network including a base station 110A. The user equipment 114A may further include a SIM 116, which further includes an access class for the SIM and the corresponding user equipment 114A. The user equipment 114A may further include an IMS client 118 for IMS services 118 (including, for example, a SIP client, an application client, an IP client, and the like). The user equipment may also have system information acquired on the AS layer (for example, acquired from a broadcast channel) including access barring information 120 provided by the network 110A.

In some example embodiments, the access stratum (AS) may inform the IMS layer about access class barring of a certain type of access or service. The ACB and emergency barring information is provided from the AS layer to the IMS layer, such as IMS client 118, to enable the barring. As such, access class barring (ACB) may, in some example embodiments, be checked on the IMS layer, such as by the IMS client 118.

Base station 110A may provide an access barring information via a broadcast, a system information block (SIB), and/or other signaling. For example, the access barring information may indicated access class 10 (emergency calls) is access barred. When an emergency call is initiated, IMS client 118 may perform, in accordance with some example embodiments, a check to see whether the emergency call is access barred, and, if so, IMS client 118 may bar the emergency call without initiating a call establishment on the AS layer where the allowance of emergence access may be checked again.

Additionally or alternatively, access barring may be applied when the user equipment is in a connected mode. During an active connection, base station 110A may send access barring parameters in a system information block and the like. The IMS client 118 may receive the access barring parameters and determine, in accordance with some example embodiments, whether the active connection has been access barred by the network.

The IMS client 118 may receive from a lower layer (for example, from the access stratum (AS) layer) access barring information 120. Table 1 below depicts an example of access barring information, in accordance with some example embodiments. The access barring information at Table 1 may be sent to user equipment 114A, where it can be retrieved by the IMS client 118. The IMS client at the user equipment may be provided with access barring information that bars, for example, some if not all MMTEL during an emergency. In addition or alternatively, ACB information may be defined for MMTEL in similar way as is done with CSFB. Specifically, a system information block may include barring information for mobile originated CSFB calls and MMTEL calls (for example, IMS voice calls).

The following provides an example behavior for an MMTEL call, so that an additional check at the IMS client 118 is added to enable access barring checks for emergency call handling (for example, ac-BarringInfo at Table 1).

TABLE 1

Service Specific Access Control

BarringFactorForMMTEL-Voice: barring rate for MMTEL voice;
BarringTimeForMMTEL-Voice: barring timer for MMTEL voice;
BarringFactorForMMTEL-Video: barring rate for MMTEL video; and
BarringTimeForMMTEL-Video: barring timer for MMTEL video.
ac-BarringInfo completely or barring for just some portions, such as
ac-BarringForEmergency.

Figure 2:
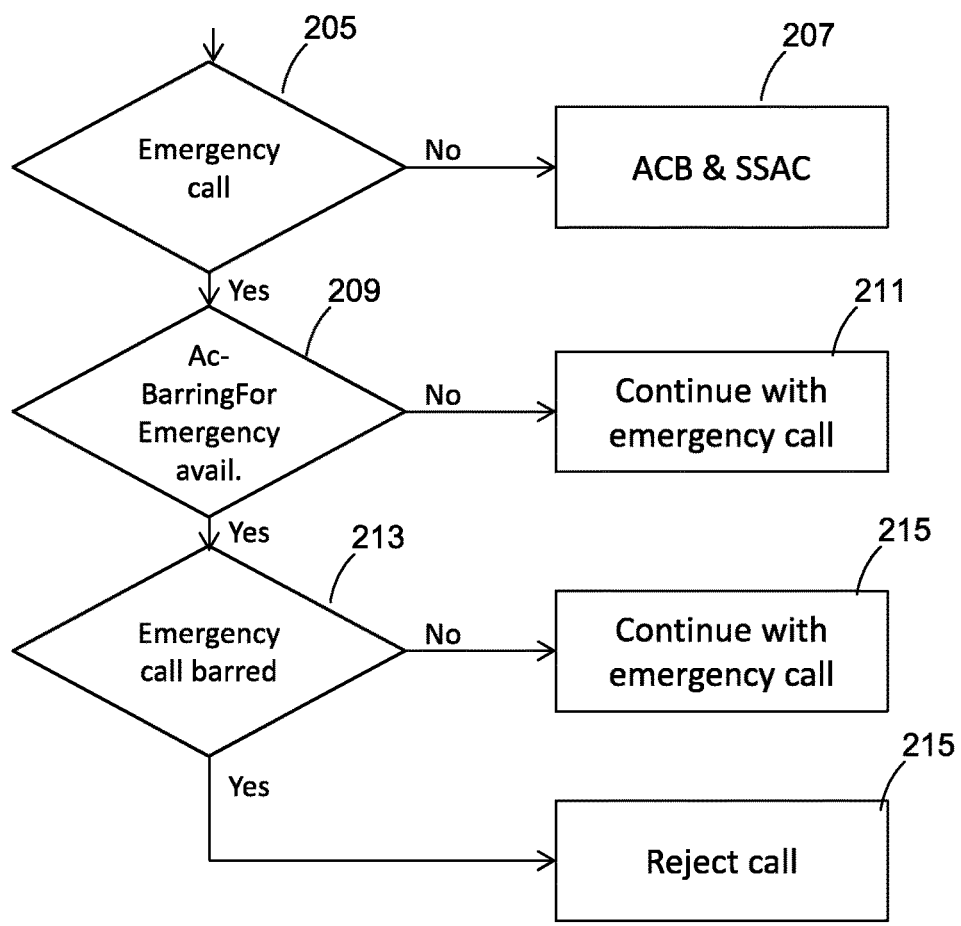
FIG. 2 depicts an example of a process for access barring, in accordance with some exemplary embodiments.

FIG. 2 depicts an example process for access barring, in accordance with some example embodiments. The description of process 200 also refers to FIG. 1.

When a request to establish a call, such as a multimedia telephony (MMTEL) communications session and the like, is received, user equipment 114A including IMS client 118 may, at 205, determine whether the multimedia telephony communications session is to be established as an emergency session. If not (no at 205 and 207), the user equipment 114/IMS client 118 may allow session establish to continue in accordance with access class bearing (ACB) and service specific access control (SSAC) procedures (as described for example in 3GPP TS 24.173, sub clause 2.)

If so (yes at 205 and 209), the IMS client 118 may retrieve from a lower access stratum layer one or more access barring parameters including access barring for emergency parameter (for example, ac-BarringForEmergency parameter at Table 1). This access barring for emergency parameter may be provided by the network to the user equipment.

If the access barring for emergency parameter (for example, ac-BarringForEmergency) is not available, the IMS client 118 may allow the emergency call to continue (no at 209 and 211).

If the access barring for emergency parameter (for example, ac-BarringForEmergency) is available and the access barring for emergency parameter is true (for example, ac-BarringForEmergency indicates emergency calls being access barred), the IMS client 118 may reject the emergency call (yes at 213 and 217).

If the access barring for emergency parameter (for example, ac-BarringForEmergency) is available and the access barring for emergency parameter is false (for example, ac-BarringForEmergency indicates emergency calls not being access barred), the IMS client 118 may allow the emergency call to continue (no at 213 and 215). Alternatively, If the access barring for emergency parameter (for example, ac-BarringForEmergency) is not available, it can be specified that the emergency call is not allowed.

Tables 2 and 3 below depicts an example specification for the process 200.

TABLE 2

1) if the multimedia telephony communication session to be established is an emergency session, then skip the rest of steps below and continue with session establishment as described in subclause 5.2, unless the ac-BarringForEmergency is set to TRUE;
   a. retrieve SSAC related information mentioned above from lower layers
   b. if the user equipment has one or more Access Classes, as stored on the USIM, with a value in the range 11..15, which is valid for the user equipment to use according to TS 22.011 [10] and TS 23.122 [11]:
     i. if the ac-BarringInfo includes ac-BarringForMO-Data, and for all of these valid Access Classes for the user equipment, the corresponding bit in the ac-BarringForSpecialAC contained in ac-BarringForMO-Data is set to one:
      1. reject the multimedia telephony communication session establishment;
   c. else:
     i. reject the multimedia telephony communication session establishment;
2) retrieve SSAC related information mentioned above from lower layers.

TABLE 3

Upon request from the upper layers, the user equipment shall:
1> set the local variables BarringFactorForMMTEL-Voice and BarringTimeForMMTEL-Voice as follows:
  2> if the user equipment is in RRC_IDLE and ssac-BarringForMMTEL-Voice is present:
    3> if the user equipment has one or more Access Classes, as stored on the USIM, with a value in the range 11..15, which is valid for the user equipment to use according to TS 22.011 [10] and TS 23.122 [11], and
NOTE: ACs 12, 13, 14 are only valid for use in the home country and ACs 11, 15 are only valid for use in the HPLMN/ EHPLMN.
    3> if, for at least one of these Access Classes, the corresponding bit in the ac-BarringForSpecialAC contained in ssac-BarringForMMTEL-Voice is set to zero:
      4> set BarringFactorForMMTEL-Voice to one and BarringTimeForMMTEL-Voice to zero;
    3> else:
      4> set BarringFactorForMMTEL-Voice and BarringTimeForMMTEL-Voice to the value of ac-BarringFactor and ac-BarringTime included in ssac-BarringForMMTEL-Voice, respectively;
  2> else set BarringFactorForMMTEL-Voice to one and BarringTimeForMMTEL-Voice to zero;
1> set the local variables BarringFactorForMMTEL-Video and BarringTimeForMMTEL-Video as follows:
  2> if the user equipment is in RRC_IDLE and ssac-BarringForMMTEL-Video is present:
    3> if the user equipment has one or more Access Classes, as stored on the USIM, with a value in the range 11..15, which is valid for the user equipment to use according to TS 22.011 [10] and TS 23.122 [11], and
    3> if, for at least one of these Access Classes, the corresponding bit in the ac-BarringForSpecialAC contained in ssac-BarringForMMTEL-Video is set to zero:
      4> set BarringFactorForMMTEL-Video to one and BarringTimeForMMTEL-Video to zero;
    3> else:
      4> set BarringFactorForMMTEL-Video and BarringTimeForMMTEL-Video to the value of ac-BarringFactor and ac-BarringTime included in ssac-BarringForMMTEL-Video, respectively;
  2> else set BarringFactorForMMTEL-Video to one and BarringTimeForMMTEL-Video to zero;
1> forward the variables BarringFactorForMMTEL-Voice, BarringTimeForMMTEL-Voice, BarringFactorForMMTEL-Video and BarringTimeForMMTEL-Video, ac-BarringInfo to the upper layers;

Although the previous example describes the IMS client retrieving the access barring for emergency parameter, other access barring parameters may be retrieved by the IMS client to bar certain calls at the IMS layer as well.

In the case of access class barring non-emergency calls, the access class barring may be made independent of SSAC (for example, if SSAC allows access then access class barring may block it). If both SSAC and ACB do not deny access at the IMS client 118, then the call is allowed. Table 4 below depicts an example specification for this second case. Third, if both SSAC and/or access class barring deny access and blocked at IMS client level, access class barring need not be checked at access stratum level.

TABLE 4

Figure 3:
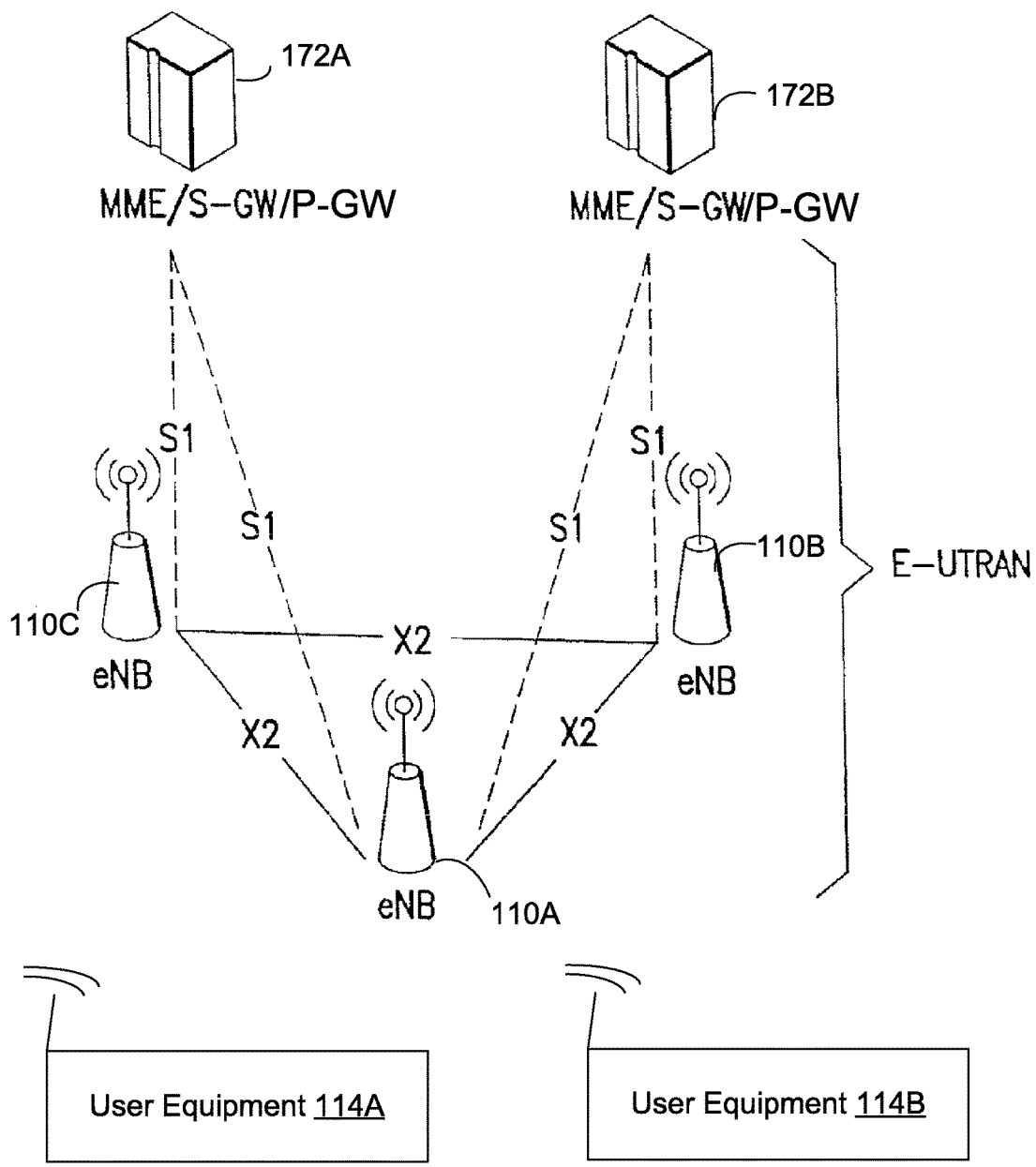
FIG. 3 depicts another example of a system in which access barring may be practiced, in accordance with some exemplary embodiments.

3) if video is offered in the multimedia telephony communication session:
   A) if back-off timer Tx is running, reject the multimedia telephony communication session establishment and skip the rest of steps below; or
   B) else, then:
      I) draw a new random number "rand1" that is uniformly distributed in the range $0 \leq rand1 < 1$; and
      II) if the random number "rand1" is lower than BarringFactorForMMTEL-Video, then skip the rest of steps below and continue with session establishment as described in subclause 5.2; OR
   II.A) if ac-BarringInfo provided by lower layers;
      if the user equipment has one or more Access Classes, as stored on the USIM, with a value in the range 11..15, which is valid for the user equipment to use according to TS 22.011 [10] and TS 23.122 [11], and for at least one of these valid Access Classes the corresponding bit in the ac-BarringForSpecialAC contained in "AC barring parameter" is set to zero then skip the rest of steps below and continue with session establishment as described in subclause 5.2;
      i) for at least one of these valid Access Classes the corresponding bit in the ac-BarringForSpecialAC contained in "AC barring parameter" is set to zero:
        a) then skip the rest of steps below and continue with session establishment as described in subclause 5.2;
      ii) else:
        a) draw a random number 'rand' uniformly distributed in the range: $0 \leq rand < 1$;
        b) if 'rand' is lower than the value indicated by ac-BarringFactor included in "AC barring parameter":
          1) then skip the rest of steps below and continue with session establishment as described in subclause 5.2;
        c) else:
          1) reject the multimedia telephony communication session establishment;
      III) else, then;
        i) draw a new random number "rand2" that is uniformly distributed in the range $0 \leq rand2 < 1$; and
        ii) start back-off timer Tx with the timer value calculated using the formula:
        Tx = (0,7 + 0,6*rand2) * BarringTimeForMMTEL-Video; and
        iii) reject the multimedia telephony communication session establishment and skip the rest of steps below;
4) if audio is offered in the multimedia telephony communication session:
   A) if back-off timer Ty is running, reject the multimedia telephony communication session establishment and skip the rest of steps below; or
   B) else, then;
      I) draw a new random number "rand3" that is uniformly distributed in the range $0 \leq rand3 < 1$; and
      II) if the random number "rand3" is lower than BarringFactorForMMTEL-Voice, then skip the rest of steps below and continue with session establishment as described in subclause 5.2; OR
   II.A) if ac-BarringInfo provided by lower layers;
      if the user equipment has one or more Access Classes, as stored on the USIM, with a value in the range 11..15, which is valid for the user equipment to use according to TS 22.011 [10] and TS 23.122 [11], and for at least one of these valid Access Classes the corresponding bit in the ac-BarringForSpecialAC contained in "AC barring parameter" is set to zero then skip the rest of steps below and continue with session establishment as described in subclause 5.2;
      i) for at least one of these valid Access Classes the corresponding bit in the ac-BarringForSpecialAC contained in "AC barring parameter" is set to zero:
        a) then skip the rest of steps below and continue with session establishment as described in subclause 5.2;
      ii) else:
        a) draw a random number 'rand' uniformly distributed in the range: $0 \leq rand < 1$;
        b) if 'rand' is lower than the value indicated by ac-BarringFactor included in "AC barring parameter":
          1) then skip the rest of steps below and continue with session establishment as described in subclause 5.2;
        c) else:
          1) reject the multimedia telephony communication session establishment;
      III) else, then;
        i) draw a new random number "rand4" that is uniformly distributed in the range $0 \leq rand4 < 1$; and
        ii) start timer Ty with the timer value calculated using the formula:
        Ty = (0,7 + 0,6*rand4) * BarringTimeForMMTEL-Voice; and
        iii) reject the multimedia telephony communication session establishment;

FIG. 3 depicts system 100 with additional detail with respect to the network. Referring to FIG. 1, the system 100 may include one or more user equipment 114A-B coupling wirelessly to one or more base stations, such as base stations 110A-C (labeled eNB, evolved Node B). The system 100 may further includes other nodes, such as a mobility management entity (MME), a serving gateway (SGW), and/or a packet gateway (PGW) 172A-B. The system 100 may also include one or more application servers, such as application server 180. Although FIG. 1 depicts an E-UTRAN (Evolved Uniform Mobile Telecommunications System Terrestrial Radio Access Network), other frameworks may be used as well. In the case of E-UTRAN, eNB base stations may provide an E-UTRA (Evolved Universal Terrestrial Radio Access) user plane and control plane protocol terminations towards the user equipment. The eNB base stations may be interconnected with each other by means of an X2 interface. The eNB base stations may also be connected via an S1 interface to an Evolved Packet Core (EPC) including other nodes, such as a mobility management entity (MME), a serving gateway (SGW), and/or a packet gateway (PGW).

Figure 4:
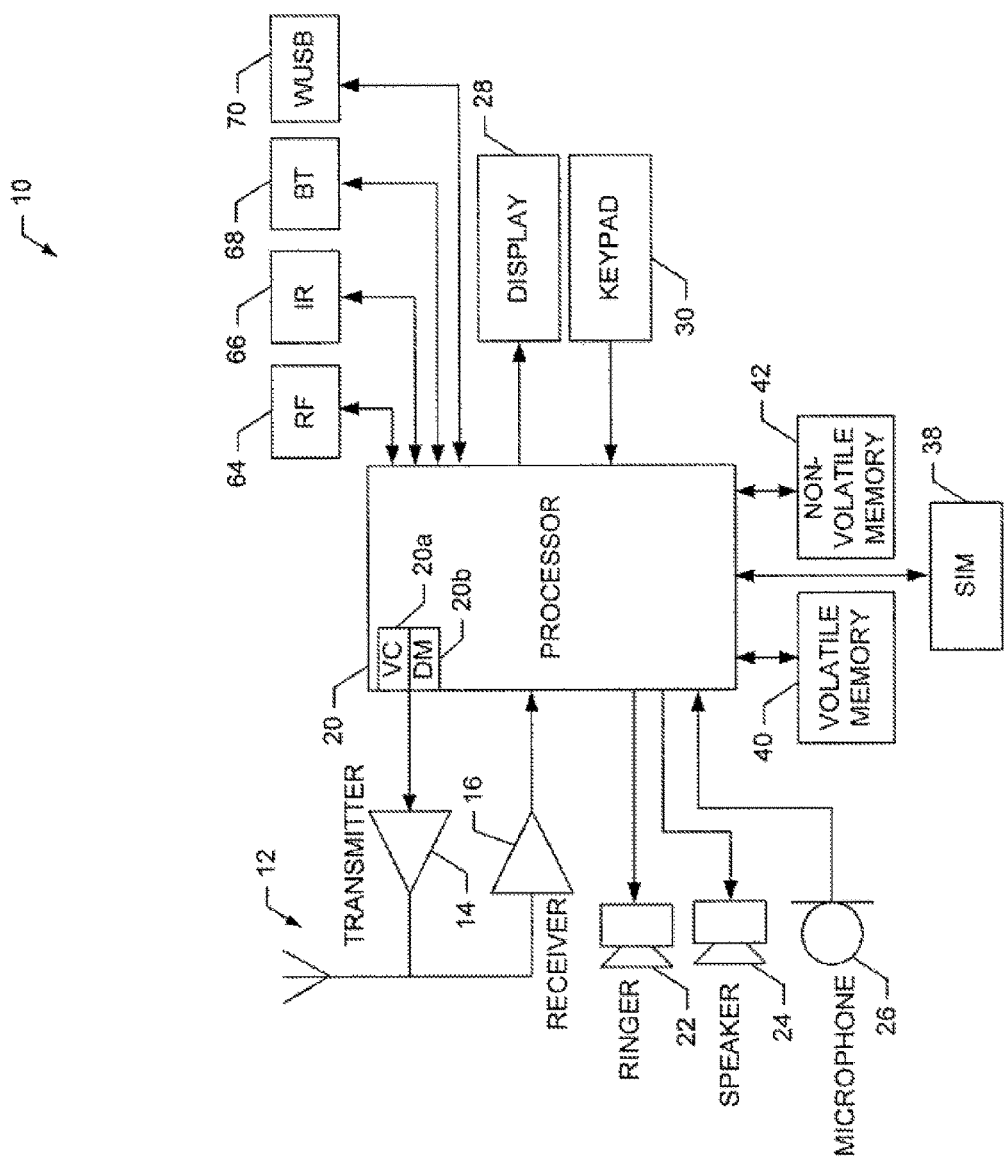
FIG. 4 depicts an example of an apparatus, in accordance with some exemplary embodiments.

FIG. 4 illustrates a block diagram of an apparatus 10, which can be configured as user equipment 114A. Apparatus 10 may be implemented as a smart phone, mobile station, a mobile unit, a subscriber station, a wireless terminal, a tablet, a wireless plug-in accessory, or any other device with a short-range transceiver, such as Bluetooth, Bluetooth Low Energy, and the like. In some example embodiments, one or more portions of the apparatus 10 may be incorporated into a media player, such as a television, wireless speaker, and the like.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth (BT) transceiver 68 operating using Bluetooth wireless technology, a wireless universal serial bus (USB) transceiver 70, a Bluetooth Low Energy link, ZigBee link, a cellular device-to-device link, a wireless local area link, a Wi-Fi link, and/or any other short-range radio technology. In this regard, the apparatus 10 and, in particular, the short-range transceiver may be capable of transmitting data to and/or receiving data from electronic devices within the proximity of the apparatus, such as within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to cause one or more of the operations disclosed herein with respect to the user equipment including process 200, receiving access barring parameters, access barring at the IMS level certain calls, and the like as disclosed herein.

Figure 5:
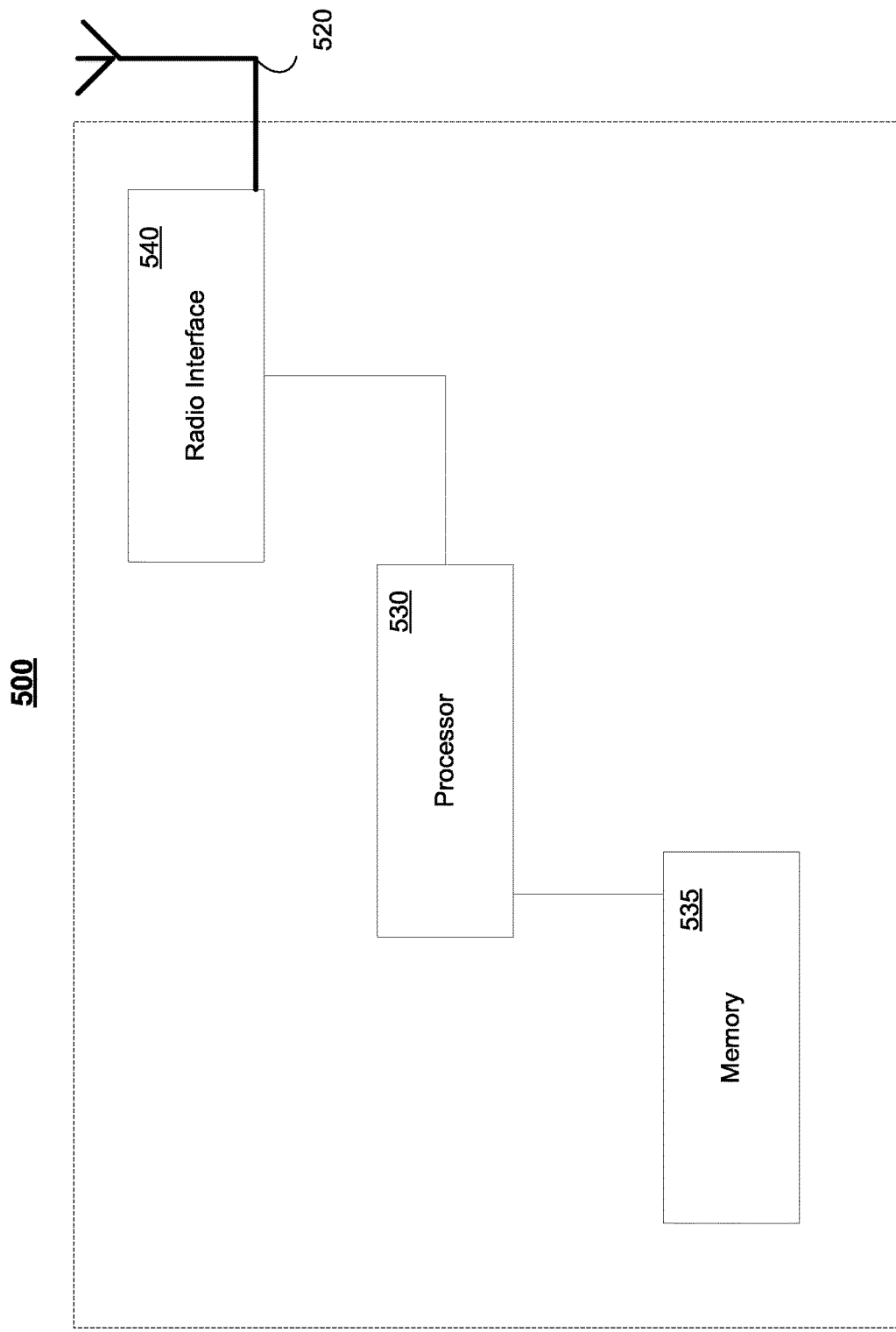
FIG. 5 depicts an example of a network node, in accordance with some exemplary embodiments.

FIG. 5 depicts an example implementation of a network node 500, such as for example a base station, an access point, and the like. The network node 500 may include one or more antennas 520 configured to transmit via a downlink and configured to receive uplinks via the antenna(s) 520. The network node 500 may further include a plurality of radio interfaces 540 coupled to the antenna 520. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio technologies. The radio interface 540 may further include other components, such as for example filters, converters (for example, digital-to-analog converters and the like), mappers, a Fast Fourier Transform (FFT) module, and the like, to generate symbols for a transmission via one or more downlinks and to receive symbols (for example, via an uplink). The network node 500 may further include one or more processors, such as for example processor 530, for controlling the network node 500 and for accessing and executing program code stored in memory 535. In some example embodiments, memory 535 includes code, which when executed by at least one processor causes one or more of the operations described herein with respect to network node, such as for example a base station, access point, and the like. For example, network node 500 may send access barring parameters to the user equipment and/or perform other operations associated with the network node, base station, or access points disclosed herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIGS. 4 and 5. A computer-readable medium may comprise a non-transitory computer-readable storage medium that may be any media that can contain or store the instructions for use by or in connection with an instruction execution system, apparatus, or device, such as a computer. In addition, some of the embodiments disclosed herein include computer programs configured to cause methods as disclosed herein.

Without in any way limiting the scope, interpretation, or application of the claims appearing below, a technical effect of one or more of the example embodiments disclosed herein is enhanced control of emergency calls.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:

1. A method comprising:
   receiving, at a user equipment, access class barring information provided by a network via an access stratum, wherein the access class barring information is indicative of whether an ongoing active connection is allowed and/or barred access to the network;
   providing, by the access stratum and to an application client at the user equipment, the received access class barring information of the ongoing active connection;
   allowing, by the application client, an ongoing active connection to proceed at the user equipment, the ongoing active connection allowed to proceed in response to the access class barring information not indicating that an access class of the ongoing active connection is not allowed and/or barred access to the network;
   determining, by the application client, whether to allow the ongoing active connection by at least accessing the access class of the user equipment to determine whether access to the network is barred, the determination of whether to allow the ongoing active connection performed in response to the access class barring information indicating that the access class of the ongoing active connection is allowed and/or not barred access to the network; and
   barring, by the application client, the ongoing active connection, the ongoing active connection barred in response to the access class barring information not being available and/or the access class barring information indicating that the access class of the ongoing active connection is allowed and/or not barred access to the network.

2. The method of claim 1, wherein the access class barring information is provided to the application client by the access stratum comprising a radio resource control client at the user equipment.

3. The method of claim 1, wherein the access class barring information further comprises emergency access barring.

4. The method of claim 1, wherein the ongoing active connection comprises an emergency call.

5. The method of claim 4, wherein the emergency call further comprises a multimedia telephone voice for emergency call.

6. The method of claim 4 further comprising:
   allowing, by the application client, the emergency call to proceed in response to the access class barring information for the emergency call not available at the user equipment.

7. The method of claim 6, wherein the radio resource control client receives the access control information from a base station via dedicated signaling, wherein the access class barring control information includes one or more access barring parameters.

8. The method of claim 4 further comprising:
   allowing, by the application client, the emergency call to proceed in response to the access class barring information for the emergency call allowing the emergency call to continue.

9. The method of claim 4, wherein the emergency call attempt further comprises a circuit switch fall back emergency call.

10. The method of claim 1, wherein the application client includes an internet protocol multimedia subsystem client.

11. The method of claim 1, wherein the radio resource control client receives the access class barring information from a base station via a system information block, wherein the access class barring information includes one or more access barring parameters.

12. The method of claim 1, wherein the ongoing active connection comprises at least one of a voice over long term evolution call, a multimedia telephony call, and a multimedia video call, a data call, a high-priority call, and a signaling exchange.

13. The method of claim 1, wherein the access class barring information further includes at least one of access class barring information and a service specific access control information.

14. The method of claim 1, wherein the user equipment is in a radio resource control connected state.

15. The method of claim 1, wherein the application client includes a session initiation protocol client.

16. An apparatus, comprising:
   at least one processor circuitry; and
   at least one memory circuitry including computer program code, the at least one memory and the computer program code configured to, with the at least one processor, cause the apparatus to at least:
      receive, at the apparatus, access class barring information provided by a network via an access stratum, wherein the access class barring information is indicative of whether an ongoing active connection is allowed and/or barred access to the network;
      provide, by the access stratum and to an application client at the apparatus, the received access class barring information of the ongoing active connection;
      allow, by the application client, an ongoing active connection to proceed at the apparatus, when the access class barring information does not indicate that an access class of the ongoing active connection is not allowed and/or barred access to the network;
      when the access class barring information indicates the access class of the ongoing active connection is not allowed and/or barred access to the network, determine, by the application client, whether to allow the ongoing active connection by at least accessing the access class of the user equipment to determine whether access to the network is barred; and
      bar, by the application client, the ongoing active connection, when the access class barring information for the ongoing active connection is not allowed and/or barred access to the network.

17. The apparatus of claim 16, wherein the access class barring information is provided to the application client by the access stratum comprising a radio resource control client at the user equipment.

* * * * *